United States Patent [19]
Ruthrford

[11] Patent Number: 5,816,185
[45] Date of Patent: Oct. 6, 1998

[54] RATCHETING MEANS FOR QUICKLY SECURING A COVER OVER A BOAT AND THE METHOD OF USING THE SAME

[76] Inventor: Gary J. Ruthrford, 1617 Main Ave., Fargo, N. Dak. 58103

[21] Appl. No.: 816,400

[22] Filed: Mar. 13, 1997

[51] Int. Cl.⁶ .................................................. B63B 17/00
[52] U.S. Cl. ............................................................ 114/361
[58] Field of Search ................................ 114/361; 135/88

[56] References Cited

U.S. PATENT DOCUMENTS

| | | | |
|---|---|---|---|
| 5,174,625 | 12/1992 | Gothier et al. | 296/98 |
| 5,380,058 | 1/1995 | Short et al. | 114/361 |
| 5,394,821 | 3/1995 | Ziegler et al. | 114/361 |
| 5,560,312 | 10/1996 | McPherson | 114/219 |

*Primary Examiner*—Stephen Avila

[57] ABSTRACT

A ratcheting means for securing a cover about a boat includes a first and second straps extending in opposite directions about the perimeter of the cover and coming together at the bow of the boat, and further includes a ratcheting device having a spindle which takes up the first strap and having an arm which is attached to the second strap. Instead of tying down the cover at selected locations around the boat, the user simply places the cover over the boat with the perimeter of the cover extending over the sides of the boat and with the straps also being extended about the sides of the boat with the ratcheting device being disposed on the back side of the boat, and tightens the straps which tightens the cover to the boat by moving a lever of the ratcheting device, which moves a pawl which rotates a sprocket which rotates the spindle which takes up the first strap, effecting the tightening of the cover about the boat. The cover is quickly secured about the boat in one convenient location rather than in multiple locations as needed with the conventional tie-downs.

11 Claims, 3 Drawing Sheets

RATCHETING MEANS FOR QUICKLY SECURING A COVER OVER A BOAT AND THE METHOD OF USING THE SAME

BACKGROUND OF THE INVENTION

This invention relates to a ratcheting means for quickly securing a cover over a boat which is quicker and easier to use, and is less apt to scratch or mar the exterior of the boat than other known tie-downs and buckles which are used for such purposes.

Boats which are moored to docks or stored on boat lifts or being transported or stored on trailers usually have a cover over the top thereof so as to prevent objects, the sun, or other environmental elements from ruining the inside of the boats including the instruments and the seats. These covers generally have eyelets spaced about the perimeter of the covers and which are adapted to receive S-shaped hooks of elastic tie-downs or one of the ends of ropes as such; wherein the other ends of the tie-downs or the ropes are either secured to the bottom of the boats or to the structures supporting the boats. Instead of having just one fastening means to fittingly secure the cover over the boat, the prior art illustrates a plurality of fasteners needing to be used along the perimeter of the cover in order to secure all ends of the cover over and about the boat.

One known prior art is a BOAT WEATHERIZATION WITH HEAT-SHRUNK PLASTIC FILM, U.S. Pat. No. 4,247,509, which includes a tie-down strap which passes through loops of the perimeter of the plastic film and which is secured and tensioned by any convenient means.

Another known prior art is an APPARATUS FOR PROTECTING A PORTION OF THE EXTERIOR OF AN AIRCRAFT, U.S. Pat. No. 4,598,883, which comprises a plurality of straps positioned about the cover and tensioned about the aircraft with buckles.

Another known prior art is a LEVER-OPERATED LOCKING AND BRAKE MEANS FOR A TARP COVER, U.S. Pat. No. 5,174,625, which describes a ratchet and pawl means to lock a tarp over a truck body.

Another known prior art is a PROTECTIVE COVER ASSEMBLY FOR BOATS AND THE LIKE, U.S. Pat. No. 5,228,408, which describes straps attached to the cover and having hook and loop means to fasten the straps about the boat.

None of the prior art describes using a pair of straps each of which has an end connected to a ratchet means for cinching the straps about the sides of the boat; wherein the straps extend through a tubular casing about the perimeter of a conventional cover.

SUMMARY OF THE INVENTION

The present invention relates to a ratcheting means for securing a cover over a boat which comprises a pair of straps each of which has a S-shaped hook attached at one of its ends and also comprises a ratchet means having an arm mounted to a spindle which has a pair of sprockets each of which is mounted at a respective end of the spindle, and further comprises a spring-loaded catch attached to the arm and biasedly engaged with the sprockets, and in addition, comprises a lever which is rotatably mounted to the spindle and which supports a spring-loaded pawl which is biasedly engaged with the sprockets. One of the straps is connected to the arm and the other strap is connected to and carried about the spindle. The straps extend through a tubular casing about the perimeter of the cover and are tightened about the exterior of the boat by the ratcheting means which takes up one of the straps to quickly secure the cover over the boat.

One objective of the present invention is to provide a ratcheting means for quickly securing a cover about a boat which allows the user to cover the boat easily and quickly and without marring up the boat, a problem which exits with the conventional straps which have hooks at both ends.

Another objective of the present invention is to provide a ratcheting means for quickly securing a cover about a boat which eliminates having to secure the cover at intervals about the boat. This ratcheting means secures the cover at essentially one location.

Yet, another objective of the present invention is to provide a ratcheting means for quickly securing a cover about a boat which can be adapted for any size of boat unlike covers which use straps which have to be of a certain size for the cover to be secured over the boat.

Further objectives and advantages of the present invention will become apparent as the description proceeds and when taken in conjunction with the accompanying drawings wherein:

DETAILED DESCRIPTION OF THE INVENTION

Figure 1:
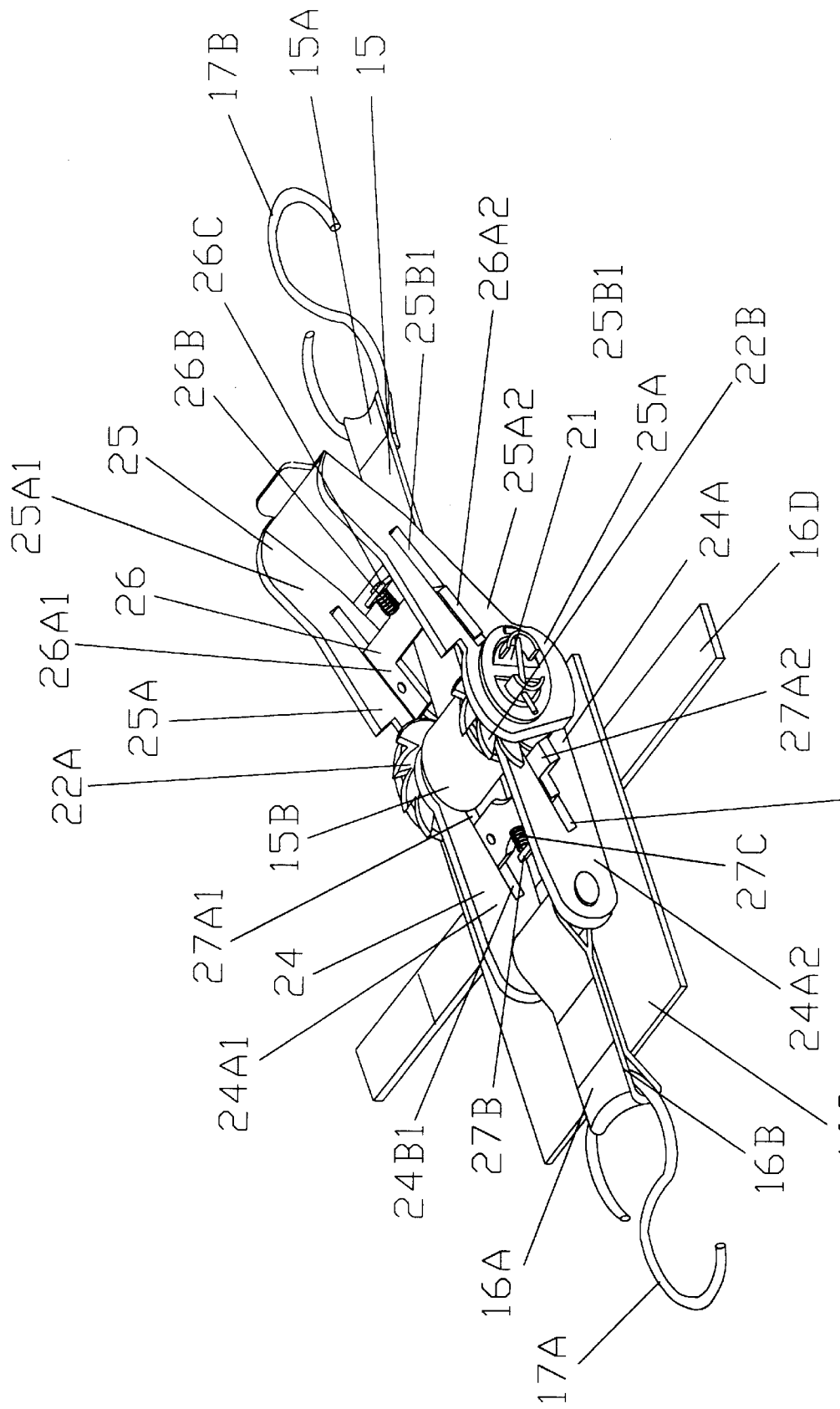
FIG. 1 is a perspective view of the ratcheting means for securing a cover about a boat.
Figure 2:
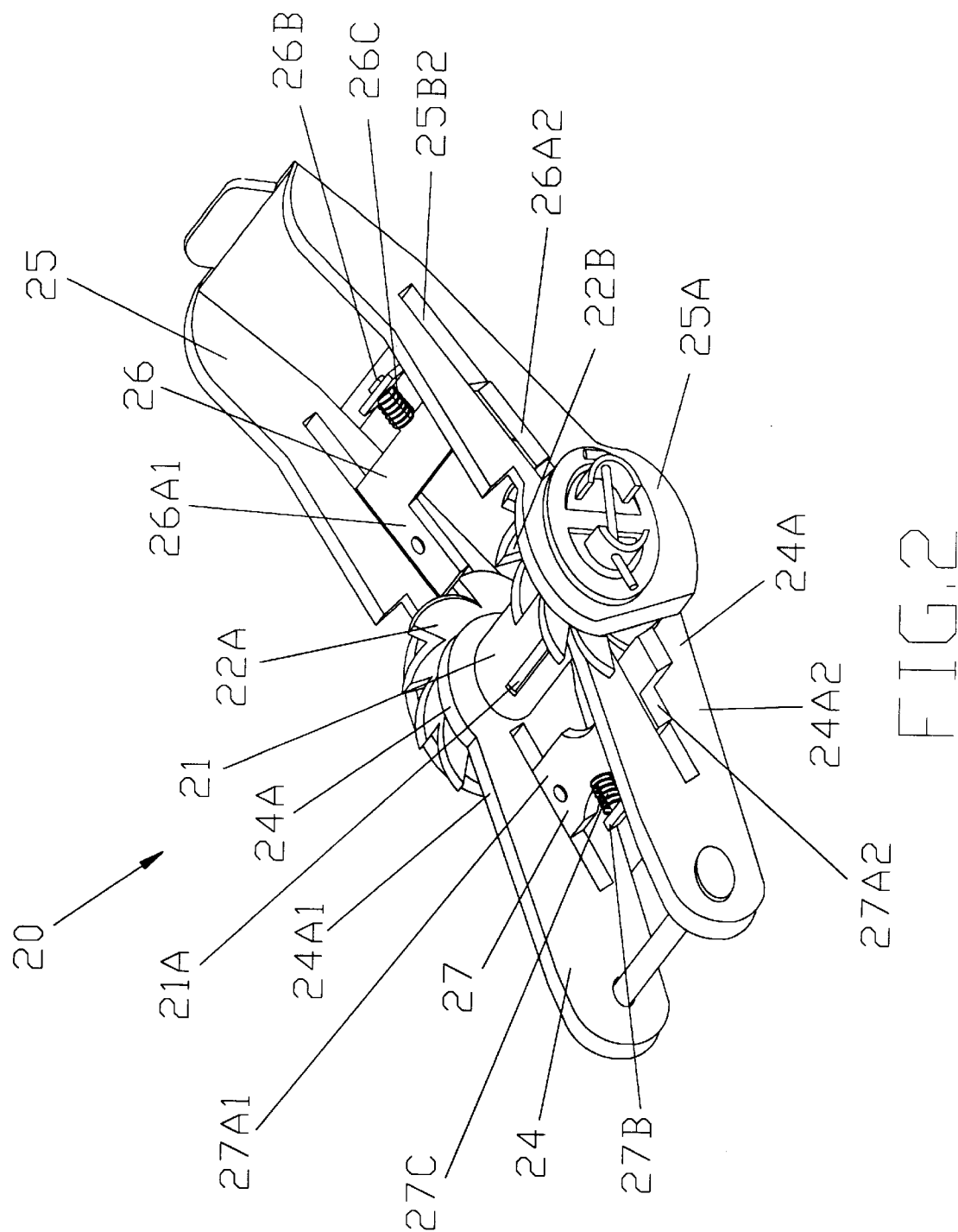
FIG. 2 is a perspective view of the ratcheting means without the straps.
Figure 3:
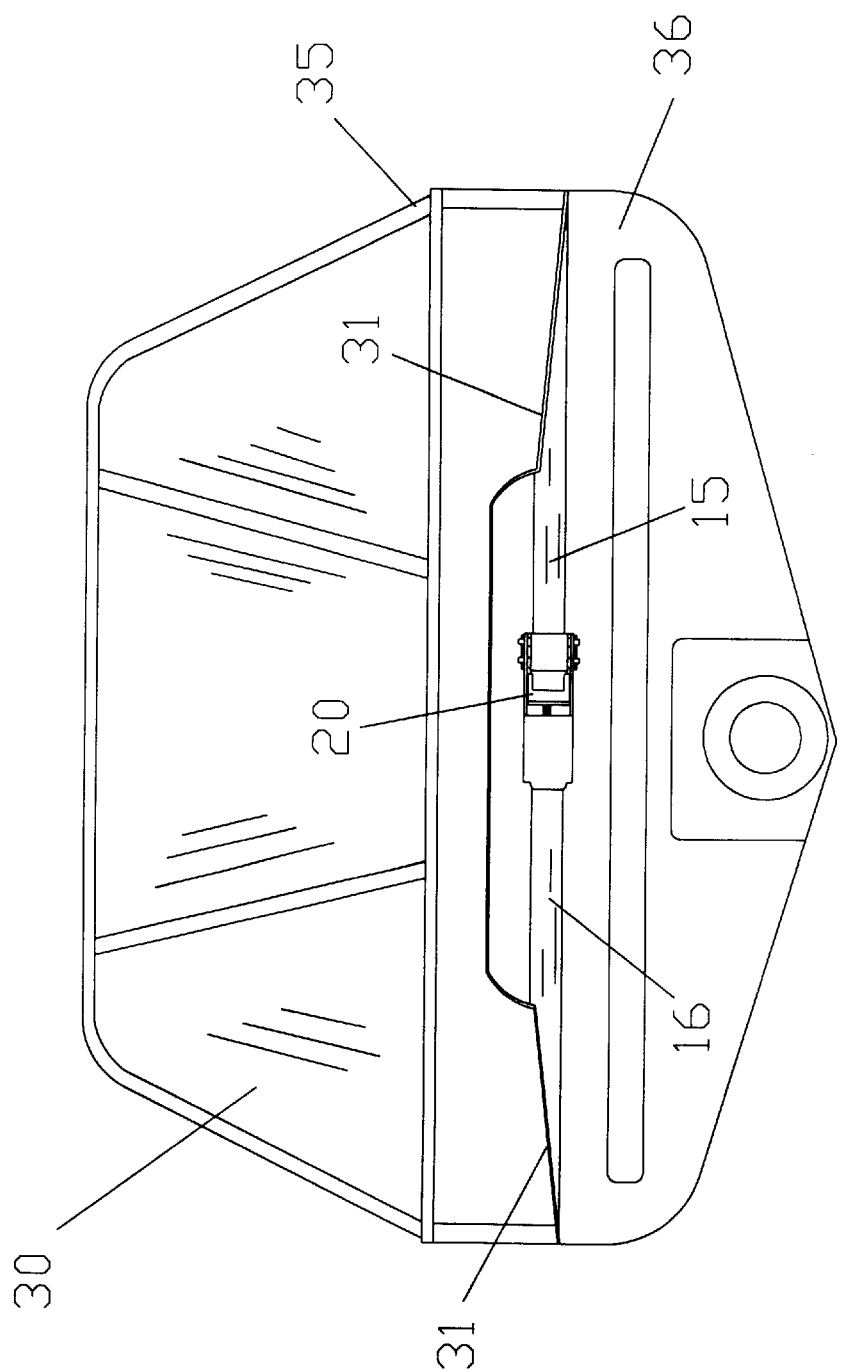
FIG. 3 is a side elevational view of the ratcheting means showing in particular the back end of a boat with a cover over the top of the boat and secured to the boat with the ratcheting means.

Referring to the drawings in FIGS. 1 & 2, a ratcheting means for securing a cover 30 over a boat 35 comprises a first and second conventional straps 15,16 preferably made of nylon and each of which having a first end 15A,16A and second end 15B,16B with the first end 15A,16A being connected or fixedly attached to a S-shaped hook 17A,17B which is used to hook about the bow of the boat 35, the straps 15,16 extending through a tubular casing 31 which is formed about the perimeter of the cover 30, and further includes a ratcheting device 20 which comprises a spindle 21 having a longitudinal slot 21A extending entirely from one side of the spindle 21 through to the other side of the spindle 21, the slot 21A being adapted to receive a second end 15B of the first strap 15 which is carried about the spindle 21. A pair of sprockets 22A–B are mounted one at each end of the spindle 21 for rotating the spindle 21 to take up the first strap 15 about the spindle 21 which tightens the straps 15,16 about the sides 36 of the boat 35. An arm 24 having a forked first end 24A which includes two sides 24A1–A2 with a slot 24B1–B2 extending longitudinally through each of the sides 24A1–A2 and which has a pair of opposed holes extending through the first end 24A, is fixedly attached to near the ends of the spindle 21 for rotation therewith.

As shown in FIGS. 1 & 2, a lever 25 also having a forked first end 25A which includes two sides 25A1–A2 with each side having a slot 25B1–B2 extending longitudinally therethrough and which also has a pair of opposed holes through the sides 25A1–A2, is rotatably mounted about the spindle 21 at the ends thereof for rotation independently of the spindle 21.

As shown in FIGS. 1 & 2, a pawl 26 having a forked first end 26A includes two extended portions 26A1–A2 with the ends of the extended portions 26A1–A2 being biasedly engaged with the teeth of a respective sprocket 22A–B and with a edge portion of each extended portion 26A1–A2 being slidably supported in a respective slot 25B1–B2 of the lever 25 which has an eyelet portion at an intermediate portion of the lever 25, the eyelet portion being adapted to receive an extended tab 26B of the pawl 26 with a spring 26C mounted about the extended tab 26B and resting against the eyelet portion and urging the extended members 26A1–A2 into engagement with the teeth of the sprockets 22A–B.

As illustrated in FIGS. 1 & 2, a catch 27 being generally the same as the pawl 26 also has a forked first end 27A which includes two extended portions 27A1–A2 with the ends of the extended portions 27A1–A2 being biasedly engaged with the teeth of a respective sprocket 22A–B and with a portion of each extended portion 27A1–A2 being slidably supported in a respective slot 24B1–B2 of the arm 24 which supports the catch 27 and which has an eyelet portion at an intermediate portion of the arm 24, the eyelet portion being adapted to receive an extended tab 27B of the catch 27 with a spring 27C mounted about the extended tab 27B and resting against the eyelet portion and urging the extended members 27A1–A2 into engagement with the teeth of the sprockets 22A–B.

The second strap 16 has its second end 16B fixedly attached or connected to the second end of the arm 24 with conventional means and has a pair of hook and loop fasteners 16C–D fixedly attached to and extending generally perpendicular in opposite directions from near the second end 16B of the second strap 16 and being adapted to wrap around the lever 25 and arm 24 to secure and hold the lever 25 and arm 24 together so that the straps 15,16 cannot be unintentionally loosened which would loosen the cover 30, especially if the boat 35 is in transit.

In use, the two straps 15,16 are inserted through the tubular casing 31 which extends for much of the perimeter of the cover 30, the straps 15,16 being inserted in opposite directions and coming and hooking together with the S–shaped 17A–B hooks at the bow of the boat 35 when the cover 30 is put in position over the boat 35 with the perimeter of the cover 30 partially extending over the sides 36 of the boat 35. Instead of having to tie down so much of the cover 30 for selected distances along the perimeter of the cover 30 with elastic tie-downs, the user positions the ratcheting device at the back side 36 or stern of the boat 35 and by moving the lever 25 toward and away from the arm 24, the pawl 26 and catch 27 rotates the sprockets 22A–B which rotates the spindle 21 causing the first strap 15 to be taken up about the spindle 21, thus tightening the straps 15,16 and the cover 30 about the boat 35. The user needs only to take up the first strap 15 with the ratcheting device 20 to secure and tighten the entire cover 30 over and about the boat 35. If the user wants to remove the cover 30 from over and about the boat 35, the user moves both the pawl 26 and catch 27 out of engagement with the teeth of the sprockets 22A–B by preferably putting one's finger between the forked extended portions 26A1–A2,27A1–A2 of the pawl 26 and catch 27 and urging the pawl 26 and catch 27 away from the sprockets 22A–B, and lets out the first strap 15 from about the spindle 21 until there is enough slack in the straps 15,16 to allow the user to lift and remove the cover 30 from over the boat 35. This invention allows the user to tighten the cover 30 only in one place unlike other known fastening means, in particular, tie-downs which are used at intervals along the perimeter of the cover 30.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A ratcheting means for securing a cover about a boat comprising:

a first and second straps extending in opposite directions about a perimeter of said cover, each of said straps having a first end which is detachably connected to the other said first end near a bow of said boat; and a ratcheting device having a spindle which carries and takes up said first strap for tightening said straps and said cover about said boat, said second strap being connected to said ratcheting device; said ratcheting device further including a pair of sprockets mounted to said spindle for rotation thereof; a lever having an end pivotally mounted about said spindle; an arm also having an end mounted about said spindle, said arm and lever being pivotable toward and away from each other; a pawl supported by said lever and being biasedly engaged to said sprockets for rotating said sprockets; and a catch supported by said arm and being biasedly engaged to said sprockets to effectively stop rotation of said sprockets.

2. A ratcheting means for securing a cover about a boat as described in claim 1, wherein said spindle has a slot extending entirely therethrough, said slot being adapted for receiving a second end of said first strap and being adapted to hold said first strap as said spindle takes up said first strap.

3. A ratcheting means for securing a cover about a boat as described in claim 2, wherein said second strap has a second end which is connected to said arm.

4. A ratcheting means for securing a cover about a boat as described in claim 3, therein said ratcheting means further includes a hook and loop fasteners fixedly attached to said second strap near said second end thereof, said hook and loop fasteners being adapted to wrap about said lever and said arm when said lever and said arm are closed upon one another, to substantially prevent loosening of said straps about said boat.

5. A ratcheting means for securing a cover about a boat as described in claim 3, wherein said ratcheting device is positioned to one side of said boat as said cover is placed about said boat to effectively tighten said straps about all sides of said boat and to effectively secure said cover over said boat.

6. A ratcheting means for securing a cover about a boat as described in claim 5, wherein said ratcheting device is positioned on the back side of said boat as said cover is placed about said boat.

7. A process of quickly securing said cover about said boat according to claim 3, which comprises the steps of:

positioning said cover over a top of said boat with the perimeter of said cover extending partially over the sides of said boat;

positioning said ratcheting device on one side of said boat including positioning said ratcheting device on the back side of said boat, said ratcheting device including at least one sprocket mounted to said spindle; a lever pivotally mounted to said spindle; an arm mounted to said spindle; a pawl supported by said lever and biasedly engaged to said at least one sprocket; and a catch supported by said arm and biasedly engaged to said at least one sprocket, said lever and said arm being pivotal toward and away from one another;

connecting said straps together near the bow of said boat; taking up said first strap with said ratcheting device, which effectively tightens said straps about said sides of said boat the tightening of said straps also resulting in said cover being secured over and about said boat; and securing said ratcheting device so that said straps remain taut about the sides of said boat.

8. A process of quickly securing said cover about said boat as described in claim 7, wherein the step of taking up said first strap includes the step of pivoting said lever toward and away from said arm, resulting in said pawl rotating said sprocket which rotates said spindle which takes up said first strap and tightens said straps about the sides of said boat.

9. A process of quickly securing said cover about said boat as described in claim 8, wherein the step of securing said ratcheting device includes the step of pivoting said lever to close upon said arm.

10. A process of quickly securing said cover about said boat as described in claim 9, wherein said second strap includes a hook and loop fasteners for wrapping about said lever and said arm to substantially prevent the unintentional loosening of said straps about said boat.

11. A process of quickly securing said cover about said boat as described in claim 10, wherein after said lever is closed upon said arm to essentially secure said spindle, said hook and loop fasteners are wrapped about said lever and said arm to prevent said lever and said arm from unintentionally opening up from one another, thus resulting in the possibility of said first strap being let out from said spindle and loosening set straps and loosening said cover about said boat.

* * * * *